Aug. 11, 1964

D. T. BROWN ET AL

ERROR CORRECTING SYSTEM FOR BINARY ERASURE CHANNEL TRANSMISSION

Filed Dec. 14, 1961

3,144,635

INVENTORS
DAVID T. BROWN
PAUL W. WOO

BY Robert W. Berray

ATTORNEY 3,144,635
Patented Aug. 11, 1964

3,144,635

ERROR CORRECTING SYSTEM FOR BINARY ERASURE CHANNEL TRANSMISSION

David T. Brown, Wappingers Falls, and Paul W. Woo, Poughkeepsie, N.Y., assignors to International Business Machines Corporation, New York, N.Y., a corporation of New York Filed Dec. 14, 1961, Ser. No. 159,282
5 Claims. (Cl. 340—146.1)

This invention relates to an error correcting system and more particularly to an error correcting system for use in a transmission channel which operates as a binary erasure channel.

Much work has been done in recent years to improve the reliability of the transfer of information in electronic systems which use binary information. The basic error correcting code utilized in the transfer of binary information has been the standard Hamming code described in Re. 23,601, "Error Detecting and Correcting System" by R. W. Hamming et al. The binary transfer system for which the Hamming code was developed transmitted binary ones and binary zeroes, usually, as a presence or absence of an electrical signal respectively. In this type of transfer system, it is quite possible for a transmitted binary one to be affected by noise or other effects such that a receiving device would not detect a signal and thus read the signal as a binary zero. In the same manner, a transmitted binary zero, which is the absence of a signal, may be affected by noise and appear at a receiving device as a binary one and be recorded as such. This type of transmission channel has been referred to as a binary symmetrical channel. A binary symmetrical channel is a channel in which binary information may be received or detected as the complement of the information originally sent. In other words, a transmitted binary zero may be detected as a binary one and a binary one may be detected as a binary zero. When the Hamming code was developed, it was required that the coding principle of the error correcting check bits be such that the various combinations of binary bits which developed the check bits had to produce a signal which would locate errors and then proceed to complement any bits which were in error.

Another method of transferring binary information is a transmission channel in which the binary information is transmitted not as the presence or absence of signals as in the binary symmetrical channel, but as electrical signals providing one type of signal to represent a binary one and an opposite type of signal to represent a binary zero. This type of transmission channel is known as a binary erasure channel. In a binary erasure channel an error caused by the complementing of the binary bits is not allowed. The only possible error in a binary erasure channel is for a signal representing a particular binary bit to be erased by noise or other defects such that the receiving device is not capable of identifying whether the particular binary bit was to be a one or zero.

In many large scale computing systems, storage of large quantities of binary characters has been accomplished by magnetic recording techniques utilizing tapes and drums. The storage of binary information on magnetic tape has most generally been accomplished by producing flux transitions on the magnetic medium to represent one of the binary bits. In the usual case, a binary one has been recorded and reproduced as a flux transition while a binary zero is identified by the absence of a flux transition.

Recently, a new magnetic recording technique has been placed into use known as phase modulation recording. In the phase modulation recording technique such as described in U.S. 2,734,186, "Magnetic Storage Systems" by F. C. Williams, binary information is represented by the direction of flux change for each binary bit. A binary one for example, is represented by a flux change from a positive polarity to a negative polarity at the center of a bit period, and a binary zero is represented by a flux change from the negative polarity to the positive polarity at the center of a bit period.

In utilizing phase modulation magnetic recording techniques, the reproducing system is such that each binary bit reproduced is represented by an electrical signal of one polarity or phase for one binary bit and an electrical signal of the opposite polarity or phase for the other binary bit. In this manner, the phase modulation recording technique utilizes a reproducing system which can be considered a binary erasure channel. By this is meant that each binary bit is represented by a signal, either of one polarity or phase or the other, such that a defect of the tape or sensing circuits will only produce an error which can be considered an erasure of the bit. The recording and reproducing techniques presently in use are such that a complementing of the binary bits to produce an error is highly unlikely and may be disregarded. By disregarding the possibility of receiving the complement of a binary bit read from the tape, an error correcting system can be devised which operates on a binary erasure channel. The encoding of error correcting check bits can be simplified to the point where location of doubtful binary information can be left to detecting techniques of the reproducing system. The check bits may then be utilized only for determining whether or not the doubtful binary information should be a binary one or a binary zero.

Present day magnetic tape recording machines utilize a width of magnetic tape such that the optimum number of binary bits which may be recorded across the tape to represent a character is approximately ten. In the prior art tape machines in which the standard Hamming code might be used, the ten possible binary bits would have to include at least four error correcting check bits to provide single error correction and double error detection for the ten binary bit character.

It is an object of this invention to provide an error correcting and detecting system with a simplicity and capability never before obtained.

It is another object of this invention to provide an error detecting and correcting system providing greater error correcting capabilities while using fewer redundant error correcting check bits than prior art devices.

It is a further object of this invention to provide an error correcting system for use in a binary erasure channel for transmitting characters having a limited number of binary bits wherein greater error correcting capabilities are provided while utilizing the fewest possible binary bits as error correcting check bits.

These objects are achieved in a preferred embodiment of this invention wherein a binary erasure transmission channel is utilized for transmitting characters having a plurality of data bits and a plurality of check bits. Each of the check bits defines the parity of a unique combination of data bits. The number of check bits is chosen such that at least one group of related bits is produced such that an error in any one of several bits of a related bit group will produce the same set of generated check bits during an error detecting procedure. The electrical signals received over the binary erasure transmission channel are utilized for storing the character transmitted in a storage device. Means are provided in the channel for detecting an erasure of a particular binary bit. The bit erasure indicating means is then utilized for providing an indication as to a related bit group to which the erased bit belongs. The information character as received in the storage device is then utilized in a parity checking arrangement to determine whether or not the erased bit has had an adverse effect on the parity. Means are then provided responsive to a parity error, to the bit erasure indicating means, and the related group indicating means for correcting the binary information in the storage device which was detected as an erased binary bit.

The foregoing and other objects, features and advantages of the invention will be apparent from the following more particular description of a preferred embodiment of the invention, as illustrated in the accompanying drawings.

Figures 1, 2:
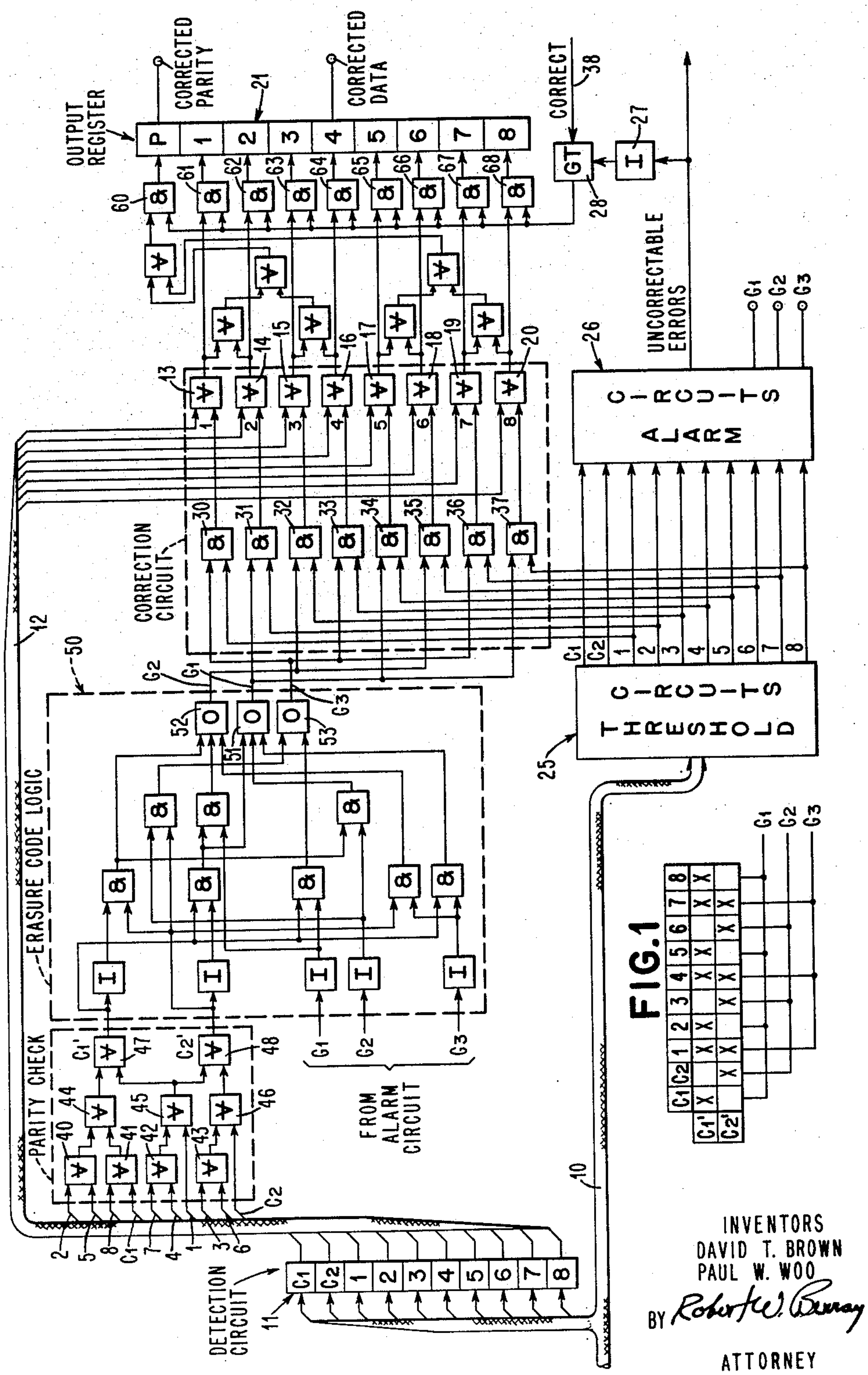
FIGURE 1 shows a matrix of binary bits representing a character transmitted over a binary erasure channel and the manner in which error correcting check bits are generated as the parity of a unique combination of the binary bits transmitted.
FIGURE 2 is a schematic representation of the logic required in a preferred embodiment of the invention providing error detection and correction in a binary erasure channel.

Probably the simplest form of error detection in any type of transmission channel is to utilize a single redundant or parity bit. The single redundant binary bit is utilized to provide an indication as to the number of binary ones transmitted as a character. An even parity arrangement results when the single redundant bit is made a binary zero if the remainder of the data bits contain an even number of binary ones. If the data bits contain an odd number of binary ones, the redundant parity bit will be made a binary one to provide an even number of binary ones for the entire character.

A single redundant parity bit could be provided for a character transmitted over a binary erasure channel to provide correction of any single error in the transmission of a character. Since the location of doubtful binary information is accomplished by amplitude sensitive means providing indication of an erasure of an electrical signal, the parity bit can be utilized, once a doubtful bit is recognized, to reconstruct the binary bit which is doubtful. If there has been a bit erasure, the doubtful bit can be made a binary one or binary zero dependent upon whether or not the remainder of the data bits and the single redundant parity bit indicates an odd number or an even number of binary ones in the character. If the parity check, after an erasure, indicates that an odd number of ones remain in the correct bits, the doubtful bit can be made a binary one to provide the desired even number of binary ones.

The reliability of a binary erasure channel error correcting system can be improved by providing two redundant parity check bits such that one of the check bits will provide a parity check for odd numbered bits of a character and the other check bit will provide a parity check for the even numbered bits of a character. In this situation, a single erasure in an odd numbered position of the character can be corrected by one of the check bits and a single erasure in even positions of the binary character can be corrected by the other check bit. By providing two check bits, all single error situations can be corrected and any double error situation which is produced by a single error in the odd or even numbered binary bits. If a double error should occur in the odd numbered binary bits, the system would not be able to correct this double error situation.

The coding scheme of the preferred embodiment of this invention is shown in FIGURE 1. The coding scheme there shown in matrix form makes the maximum possible use of two binary check bits. The binary character consists of ten binary bits including two check bits, C1 and C2 and eight data bits in positions 1–8. This ten bit character could be recorded on magnetic tape in the phase modulation recording technique discussed earlier. The matrix shown in FIGURE 1 is utilized to show the manner in which each of the checks bits C1 and C2 are generated to provide the parity of a unique combination of bits of the character. Check bit C1 is generated and transmitted as the parity of the binary information in channels 1, 2, 4, 5, 7 and 8. Check bit C2 is generated and transmitted as the parity of the binary information in channels 1, 3, 4, 6, 7.

The symbols C1′ and C2′ shown at the left of the matrix represent the generated check bits produced as a result of a parity check of the received character from tape. If the entire character is received correctly from tape, a parity check of the data bits and the accompanying check bits C1 and C2 will produce a binary zero for the generated check bits C1′ and C2′. If a parity error results from a defect in the transmission, the check bits C1′ and C2′ will assume several combinations of binary zeros and binary ones dependent upon where the parity error has been introduced.

A study of the Hamming technique for error detection and correction will indicate that each of the binary check bits which perform the error detection and correction is generated by a combination of data bits such that an error in any one data bit will provide a unique combination of generated check bits. It is apparent from FIGURE 1 that such is not the case in the preferred embodiment of the invention for use in a binary erasure channel. The use of two binary check bits in the ten position character results in several groups of related bits which have been labeled G1, G2 and G3. The result of this situation is that an error in any one position of a related bit group will produce the same combination of generated check bits C1′ and C2′. In other words, if there is an error in C1, 2, 5 or 8, the same generated check bit C1′ would be produced. Assuming a single error condition in any one of these enumerated positions, the problem of identifying which of the bits of a related group is in error will be accomplished by the bit erasure indicating means. Even though these related bits can produce the same generated check bit combination, the one bit in the related group which has caused the error can be identified by noting which of these bits has been indicated as being erased.

By comparing the code matrix in FIGURE 1 with the situation previously discussed wherein the two check bits were utilized to show the parity of even or odd numbered positions, the capabilities of the two check bits have been greatly improved. In the even-odd situation it was impossible to correct a double error in channels 1 and 3. With the matrix of FIGURE 1, however, an error in channels 1 and 3 will produce a different combination of generated check bits C1′ and C2′. The number of uncorrectable double errors has therefore been reduced. The only double error combinations which can not be corrected by the matrix in FIGURE 1 is the situation in which the double error occurs in two bits of a single related bit group.

FIGURE 2 represents the logic required for perfoming error correction on the binary erasure transmission channel of the preferred embodiment of the invention. A ten bit binary character is received into the error correcting system over a cable 10. The cable 10 can be the transmission lines required to transmit electrical signals from magnetic heads associated with a tape device. The binary erasure channel properties result from the use of a recording technique which provides an electrical signal for each binary one and binary zero. The electrical signals can be in the form of a signal of one phase to represent a binary one and a signal of the opposite phase to represent a binary zero. Each of the signals received should have a specified signal strength if the information has been properly recorded on tape without defects.

Numeral 11 designates any suitable detection scheme which can discriminate between the opposite signals received from the tape over cable 10. Assuming electrical signals of the proper amplitude and signal strength are received, the detection device 11 will insert in a ten position register the binary character received. The detection device should be such that the bistable device for a particular channel of the tape will be set to indicate a binary one or zero dependent upon the polarity or phase of the signal received. If a particular channel received into the detection means 11 contains a signal which has been erased, or is otherwise of doubtful identity, note will be made of this in logic to be discussed later.

When a particular bistable device in the detection circuit 11 is set to the binary one or zero state, a cable 12 transmits this information to a series of exclusive-OR circuits 13–20. Exclusive-OR circuits are such that a binary one output will be produced whenever a single one of the binary inputs is a binary one. If both inputs are binary one or both inputs are binary zero, the exclusive-OR will produce a binary zero output. The result of the signals over cable 12 to exclusive-OR circuits 13–20 and signals from the error detecting and correcting circuits to be described later, is to gate through AND circuits 60–68 corrected data to an output storage register 21.

The electrical signals on cable 10 representing binary ones and zeros are utilized in the detection circuit 11 for entering information into the detection device, and are also sent to bit erasure indicating circuits designated by the numeral 25. The threshold circuits 25 may be any suitable means which are primarily amplitude sensitive such that for each character received, a logical output will be produced whenever there is a doubtful or absent signal for a particular bit. Whenever a particular bit or bits is received in the threshold circuits 25 which can not be distinguished as being either a binary one or a binary zero, a logical output will be produced indicating an erasure of the bit or bits.

The output of the threshold circuits 25 are applied to an alarm circuit designated by the numeral 26. The alarm circuit 26 provides a logical combination of all the bit erasure lines from threshold circuits 25 to indicate the related bit groups G1, G2 or G3, to which an erased bit belongs. Another function of the alarm circuit 26 is to provide a logical output whenever an uncorrectable pattern of bit erasures has been produced. This situation exists when more than one bit erasure has been indicated for a particular related bit group, or whenever three bit erasures have occurred such that all three related bit groups indicate an error. The output of the alarm circuit 26 indicates to any suitable control system that an uncorrectable pattern of errors exist. The output of the alarm circuit 26 is also utilized through an inverter 27 and a gate 28 to condition the AND circuits 60–68 to cause correction unless an uncorrectable pattern of erasures exists. At a suitable time during each correction cycle, a pulse will be received at gate 28 over a line 38 indicating that it is time to perform a correction.

The outputs of the threshold circuits 25 indicating the bits erased are also applied to AND circuits 30–37. The cooperation of the bit erasure lines from threshold circuits 25 with the parity check logic will be discussed later.

When each character has been entered into the detection storage 11, a parity check is conducted on the information character as received. The generated check bits C1′ and C2′ are generated by a series of exclusive-OR logic devices 40–48. The exclusive-OR circuits 40–48 check the parity of the character as received in accordance with the matrix shown in FIGURE 1. If the parity is correct, exclusive-OR circuits 47 and 48 will produce a logical binary zero output. If the parity check is not correct, exclusive-OR circuits 47 and 48 will provide logical binary one outputs in three possible error conditions.

It should be noted at this time that when a particular data bit input to the detection and storage circuit 11 is not distinguishable as either a zero or a one, or is doubtful, a situation can result in which it is possible for the threshold circuits 25 to indicate that a particular bit is questionable but when the parity check is made, it is found that the particular bit or bits which were erased are proper resulting in a correct parity check. In this situation, even though a particular bit has been erased, no correction is made because the particular bit that was erased is proper. If the insertion of the binary bits in a particular bit position has been accompanied by an erasure, and it is then determined through a parity check that the parity is wrong for either generated check bit C1′ or C2′, the indication is combined at AND circuits 30–37 to provide a correction signal to a corresponding one of exclusive-OR circuits 13–20.

To develop the logic required to distinguish between situations when parity errors and erasures require correction and erasures which do not require correction, a truth table may be produced based on the permutations of generated check bits C1′ and C2′ and permutations of the related group signals. Each permutation of the generated check bits C1′ and C2′ is combined with all possible permutations of the related group signals to provide the logic necessary to indicate when an erased bit of a particular related bit group should be corrected. There are situations in which related bit group erasures may be produced but which do not require correction because there is no parity error. There are likewise situations in which parity errors are indicated but no bit erasures have been detected. This situation is not possible in a true binary erasure channel in which it is stated that the binary bits can not be received as the complement of the binary bit transmitted. As a result of generating the truth table and thereby proceeding to the use of Karnaugh maps, known by those skilled in the art, the logic required for indicating when bit erasures should be corrected can be produced.

The truth table and Karnaugh maps provide the minimum logic for providing the necessary indication as to when a particular related bit group requires correction. This logic is performed by a series of inverters and AND circuits included within the dotted box represented by the numeral 50. OR circuits 51, 52 and 53 provide the logical output indicating when a particular related bit group should be corrected. The equations for performing the correction logic are as follows:

$$\text{Correct } G1 = C1' \cdot \overline{G3} + C1' \cdot \overline{C2'} + \overline{C1'} \cdot C2' \cdot \overline{G2}$$

$$\text{Correct } G2 = C2' \cdot \overline{G3} + \overline{C1'} \cdot C2' + C1' \cdot \overline{C2'} \cdot \overline{G1}$$

$$\text{Correct } G3 = C1' \cdot \overline{G1} + C2' \cdot \overline{G2}$$

The reasoning behind this logic becomes apparent when the above equations are compared with the matrix of FIGURE 1. Take for example, the channels 2, 3 and 4 which correspond to the three possible related bit groups G1, G2 and G3 respectively. Compare the above equation for the correction of G1, or channel 2, with the matrix of FIGURE 1. If check bit C1′ is generated, it is impossible to tell at this time whether the error was caused by channel 2 or channel 4. But when C1′ is combined with the $\overline{G3}$ erasure signal, it immediately becomes apparent that it is channel 2 in error. In the same manner, if the combination of generated check bits C1′ and $\overline{C2}$ is generated, it immediately becomes apparent that channel 4 is not in error because the check bit C2′ would have been generated, thus correction is required only in channel 2. And further, with the combination of check bits is $\overline{C1}$ C2, it is not clear whether there is a double error in channels 2 and 4 or if there is a single error in channel 3 only. If we now combine $\overline{C1'}$ C2 with an indication that there is no erasure in channel 3 ($\overline{G2}$), it is apparent at this time that there is a double error in channels 2 and 4 such that at least channel 2 should be corrected. The same reasoning can be followed through for the requirements for correcting G2. The correction of G3 is only related to the indication as to whether or not check bit C1′ and a no erasure signal for the G1 bit group, or C2′ and no erasure in the G2 bit group has been produced.

Notice should be made at this time of a situation in which it is possible to provide an indication from all of the OR circuits 51, 52 and 53 but only two will be effective at AND circuits 30–37. Take for example the situation in which $C1' \overline{C2'} \overline{G1}$ is produced. This is a situation in which there is a double error in channels 3 and 4. It can be seen, however, from the equations shown above, that a combination of $C1' \overline{C2}$ will produce an output from OR circuit 51, the combination of $C1' \overline{C2'} \overline{G1}$ will produce an output from OR circuit 52, and the combination of $C1' \overline{G1}$ will produce an output from OR circuit 53. The only corrections which will be made, however, will be through AND circuits 32 and 33 because these are the only AND circuits which have been conditioned by a bit erasure indication from the threshold circuits 25 corresponding to channels 3 and 4. The output of OR circuit 51, indicating that a correction should be made in the G1 bit group will have no effect at AND circuits 31, 34 or 37 because none of these AND circuits will have been conditioned by the bit erasure indicating lines from the threshold circuits 25.

There has thus been shown logic means responsive to bit erasure lines from threshold circuits 25, parity errors from exclusive-OR circuits 47 and 48 and the indication as to the related bit groups to which erased bits belong that a correction should be made to exclusive-OR circuits 13–20. At the time of the correction pulse on line 38, exclusive-OR circuits 13–20 will have as inputs the binary information from the detection means 11, and possible correction signals from one or two of AND circuits 30–37. If a particular bit is received as a doubtful binary one and correction is required, the corresponding exclusive-OR will produce a corrected zero output to the output register 21. If the doubtful binary one does not require correction, the exclusive-OR output will be the proper binary one to register 21. Likewise, a doubtful binary zero which requires correction will produce an exclusive-OR output of binary one, or a binary zero which does not require correction will produce binary zero.

Once the binary character has been corrected in the output storage register 21, a device which utilizes the corrected data will be operating on a binary symmetrical channel basis. The eight binary bits which actually represent data are provided with a single parity bit utilized in the standard fashion. This parity bit is generated by a series of exclusive-OR circuits which provide the necessary input to indicate whether or not the eight corrected data bits contain an even or odd number of binary one bits.

Certain modifications to this preferred embodiment of the invention will be apparent to those skilled in the art. The preferred embodiment of the invention shown herein produces the maximum possible use for two binary check bits in a ten binary bit character from tape. The use of two binary check bits in a situation where each checks either odd or even numbered data positions as previously mentioned is such that only 25 out of a possible 45 double errors are correctable. By providing the matrix shown in FIGURE 1, the same two binary check bits can provide correction of 33 out of a possible 45 double errors. The same logic as herein disclosed can be utilized with a matrix composed of three binary check bits providing the use of only seven channels as binary data. A few more double error situations are correctable in this situation but the number of data bits has been reduced and yet not all double error situations are correctable. The code can be taken one step further by providing four binary check bits leaving six binary bits for data. With four binary check bits, logic can be provided whereby all possible double error combinations can be corrected as well as all single errors. The use of a truth table and other known means for generating the logic can develop logic for providing some triple-error correction.

It should also be apparent at this time that the same two binary check bits provided in the matrix of FIGURE 1 can be utilized with additional binary data bits wherein each of the related bit groups will have a greater number of bits in the group. The addition of more data bits increases the possible double error combinations but the ratio of uncorrectable double errors remains substantially unchanged.

There has thus been described and shown an error correcting technique for use in a binary erasure channel which provides the maximum capability for a minimum number of binary check bits such that a more reliable data handling system can be produced.

While the invention has been particularly shown and described with reference to a preferred embodiment thereof, it will be understood by those skilled in the art that the foregoing and other changes in form and details may be made therein without departing from the spirit and scope of the invention.

We claim:

1. In a binary erasure transmission channel for transmitting characters of $n$ binary data bits including $k$ binary check bits where $2^k$ permutations of check bits are produced as a result of defining each of the $k$ check bits as the parity of a unique combination of data bits wherein $n \geqslant 2^k$, such that at least one of $2^k-1$ possible groups of related bits is produced so that an error in any one of two or more bits of a related group will produce the same permutation of check bits, the combination comprising:
   - means responsive to the presence of complementary electrical signals representing said binary data and check bits for receiving each character transmitted;
   - means operative to indicate an erasure of the complementary electrical signals representing a particular data or check bit;
   - means responsive to said bit erasure indicating means for indicating the related bit group to which the erased bit belongs;
   - parity checking means responsive to each unique combination of data bits in said receiving means;
   - and logic means connected to said parity checking means, to said related group indicating means, and said bit erasure indicating means, operative in response to a parity error to correct the bit which was erased.

2. In a binary erasure transmission channel for transmitting characters of $n$ binary data bits including $k$ binary check bits where $2^k$ permutations of check bits are produced as a result of defining each of the $k$ check bits as the parity of a unique combination of data bits wherein $n \geqslant 2^k$, such that at least one of $2^k-1$ possible groups of related bits is produced so that an error in any one of two or more bits of a related group will produce the same permutation of check bits, the combination comprising:
   - means responsive to the presence of complementary electrical signals representing said binary data and check bits for receiving each character transmitted;
   - means operative in response to the absence of a complementary electrical signal for a particular data or check bit to indicate an erasure of that bit;
   - means responsive to said bit erasure indicating means for indicating the related bit group to which the erased bit belongs;
   - parity checking means responsive to each unique combination of data bits in said receiving means;
   - means connected to said parity checking means and to said related group indicating means, operative in response to a parity error for providing a correction signal indicating that correction is required in a said indicated related bit group;
   - and bit correcting means, responsive to said bit erasure indicating means and said correction signal, operative to correct the erased bit.

3. In a binary erasure transmission channel for transmitting characters of $n$ binary data bits including $k$ binary check bits where $2^k$ permutations of check bits are produced as a result of defining each of the $k$ check bits as the parity of a unique combination of data bits wherein $n \geqslant 2^k$, such that at least one of $2^k-1$ possible groups of related bits is produced so that an error in any one of two or more bits of a related group will produce the same permutation of check bits, the combination comprising:

means responsive to the presence of complementary electrical signals representing said binary data and check bits for receiving each character transmitted;

means operative in response to the absence of a complementary electrical signal for one or more data or check bits to indicate erasure of those bits;

means responsive to said bit erasure indicating means for indicating the related bit group to which the erased bits belong;

parity checking means responsive to each unique combination of data bits in said receiving means;

and logic means connected to said parity checking means, to said related group indicating means, and said bit erasure indicating means, operative in response to parity errors to correct the bits which were erased.

4. In a binary erasure transmission channel for transmitting characters of $n$ binary data bits including $k$ binary check bits where $2^k$ permutations of check bits are produced as a result of defining each of the $k$ check bits as the parity of a unique combination of data bits wherein $n \geqslant 2^k$, such that at least one of $2^k-1$ possible groups of related bits is produced so that an error in any one of two or more bits of a related group will produce the same permutation of check bits, the combination comprising:

means responsive to the presence of complementary electrical signals representing said binary data and check bits for receiving each character transmitted;

means operative in response to the absence of a complementary electrical signal for one or more data or check bits to indicate an erasure of those bits;

means responsive to said bit erasure indicating means for indicating the related bit group to which the erased bits belong;

parity checking means responsive to each unique combination of data bits in said receiving means;

logic means connected to said parity checking means, to said related group indicating means, and said bit erasure indicating means, operative in response to parity errors to correct the bits which were erased;

and means connected to said bit erasure indicating means, operative in response to more than one bit erasure in one related group, to inhibit said correcting means.

5. In a binary erasure transmission channel for transmitting characters having a plurality of binary data bits and a plurality of binary check bits where each check bit is produced as a result of defining the parity of a unique combination of data bits such that at least one group of related bits is produced so that an error in any one of two or more bits of a related group will produce the same permutation of check bits, the combination comprising:

means responsive to the presence of complementary electrical signals representing said binary data and check bits for receiving each character transmitted;

means operative to indicate an erasure of a complementary electrical signal representing a particular bit;

means combining said bit erasure indicating means for indicating the related bit group to which the erased bit belongs;

parity checking means responsive to each unique combination of data bits in said receiving means;

and logic means connected to said parity checking means, to said combining means, and said bit erasure indicating means, operative in response to a parity error to correct the bit which was erased.

References Cited in the file of this patent

UNITED STATES PATENTS

Re. 23,601 Hamming et al. ---------- Dec. 23, 1952